(12) United States Patent
Fang et al.

(10) Patent No.: US 8,903,001 B2
(45) Date of Patent: Dec. 2, 2014

(54) CHANNEL ESTIMATION WITH DECISION FEEDBACK

(71) Applicant: Marvell World Trade Ltd., St. Michael (BB)

(72) Inventors: Jing Fang, San Jose, CA (US); Kok-Wui Cheong, Mountain View, CA (US)

(73) Assignee: Marvell World Trade Ltd. (BB)

( * ) Notice: Subject to any disclaimer, the term of this patent is extended or adjusted under 35 U.S.C. 154(b) by 10 days.

(21) Appl. No.: 13/670,597

(22) Filed: Nov. 7, 2012

(65) Prior Publication Data

US 2013/0121393 A1    May 16, 2013

Related U.S. Application Data

(60) Provisional application No. 61/558,381, filed on Nov. 10, 2011, provisional application No. 61/650,175, filed on May 22, 2012.

(51) Int. Cl.
*H04L 27/28* (2006.01)
*H04L 25/03* (2006.01)
*H04L 25/02* (2006.01)

(52) U.S. Cl.
CPC ........ *H04L 25/023* (2013.01); *H04L 25/03159* (2013.01); *H04L 25/0232* (2013.01); *H04L 25/0204* (2013.01); *H04L 25/022* (2013.01)
USPC ........... 375/260; 375/262; 375/267; 375/295; 375/316; 375/340

(58) Field of Classification Search
CPC .............. H04L 25/022; H04L 25/0236; H04L 2025/03414; H04L 2025/0349; H04L 25/0204; H04L 25/023; H04L 25/0232; H04L 25/025; H04L 25/03159; H04L 25/03324; H04L 25/03821; H04L 25/03828; H04L 27/2647
USPC ......... 375/259, 260, 262, 267, 270, 272, 285, 375/286, 295, 299, 316, 320, 322, 339, 340, 375/342, 347, 350
See application file for complete search history.

(56) References Cited

U.S. PATENT DOCUMENTS 6,219,334 B1     4/2001   Sato et al.
7,995,688 B2 *   8/2011   Hong et al. .................. 375/346

(Continued)

FOREIGN PATENT DOCUMENTS

WO       2007/083902 A1     7/2007
WO    WO 2007083902 A1 *    7/2007

OTHER PUBLICATIONS

Patent Cooperation Treaty (PCT), International Search Report and Written Opinion issued in co-pending PCT International Application No. PCT/US/2012/063784 (International Filing Date: Nov. 7, 2012) having a Date of Mailing of Jan. 4, 2013 (14 pgs).

(Continued)

*Primary Examiner* — Hirdepal Singh

(57) ABSTRACT

Systems, methods, and other embodiments associated with a method for estimating a channel between a wireless transmitter and a wireless receiver are described. According to one embodiment, a method includes receiving a signal that includes non-pilot data that is not known to a receiver of the signal; determining an estimated channel for the signal based, at least in part, on the non-pilot data; processing the signal based, at least in part, on the estimated channel to produce an equalized signal; and decoding the equalized signal to produce output data.

19 Claims, 6 Drawing Sheets

(56) References Cited

U.S. PATENT DOCUMENTS

| | | | |
|---|---|---|---|
| 8,238,482 B2* | 8/2012 | Chen et al. | 375/340 |
| 8,520,781 B2* | 8/2013 | Weng et al. | 375/340 |
| 8,625,656 B2* | 1/2014 | Luo et al. | 375/148 |
| 8,660,200 B2* | 2/2014 | Patel et al. | 375/267 |
| 8,675,749 B2* | 3/2014 | Khoshgard et al. | 375/260 |
| 2002/0167923 A1* | 11/2002 | Sendonaris et al. | 370/335 |
| 2005/0176436 A1* | 8/2005 | Mantravadi et al. | 455/450 |
| 2008/0032630 A1* | 2/2008 | Kim et al. | 455/45 |
| 2008/0159458 A1* | 7/2008 | Cheng et al. | 375/358 |
| 2009/0285314 A1 | 11/2009 | Yousef et al. | |
| 2010/0124293 A1* | 5/2010 | Rajagopal | 375/260 |
| 2010/0158176 A1* | 6/2010 | Luo et al. | 375/350 |
| 2011/0164557 A1* | 7/2011 | Ariyavisitakul et al. | 370/328 |

OTHER PUBLICATIONS

Funada R et al: "A Channel Estimation Method for a Highly Mobile OFDM Wireless Access System," IEICE Transactions on Communications, vol. E88-B, No. 1, Jan. 1, 2005, pp. 282-291.

* cited by examiner

CHANNEL ESTIMATION WITH DECISION FEEDBACK

CROSS REFERENCE TO RELATED APPLICATIONS

This patent disclosure claims the benefit of U.S. Provisional Application No. 61/558,381 filed on Nov. 10, 2011, and U.S. Provisional Application No. 61/650,175 filed on May 22, 2012 which are incorporated herein by reference.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

In a wireless network, a transmitter communicates with a receiver by transmitting a signal to the receiver through a communication link or signal path, also commonly referred to as a "channel". The communication link or signal path between a transmitter and a receiver can be represented by an effective channel, H. The effective channel represents the combined effect of signal deflection due to obstacles (hills, walls, and so on), scattering, fading, and power decay due to the distance between a transmitter and a receiver. If either the transmitter or receiver is in motion, the effective channel will be constantly changing. Further, other obstacles in the signal path that affect the channel may be moving. A conventional receiver is typically configured with an equalizer that attempts to undo effects on a signal caused by the channel that carries the signal, therefore, the effective channel is continuously determined to allow effective communication even when one or both of the transmitter and receiver are moving. The quality of the output data produced by the receiver is dependent upon accurately determining the effective channel.

One way to estimate an instantaneous effective channel between a receiver and a transmitter is for the transmitter to transmit a known pilot sequence. The pilot sequence can be inserted in predetermined positions in frames of data-carrying signals from the transmitter. The receiver determines the effective channel H based on characteristics of the pilot sequence. Accordingly, an equalizer can utilize the effective channel H to compensate for the effects of the channel on a received signal. Channel estimation and equalization may be implemented in either the time domain (e.g., pre FFT) or the frequency domain (e.g., post FFT). In orthogonal frequency domain multiplexed (OFDM) communication systems, channel estimation and equalization are performed in the frequency domain.

SUMMARY

In general, in one aspect this specification discloses an apparatus for estimating a channel between a wireless transmitter and a wireless receiver. The apparatus includes a receiver configured to receive a signal transmitted through an effective channel, wherein the signal comprises i) pilot data that is known to the receiver and ii) non-pilot data that is not known to the receiver. The apparatus includes a channel estimation logic configured to determine an estimated channel that estimates the effective channel based, at least in part, on the non-pilot data in the signal. The apparatus includes an equalizer configured to process a signal based, at least in part, on the estimated channel to produce an equalized signal. The apparatus includes a decision logic configured to decode the equalized signal to produce output data.

In one embodiment, the signal is an orthogonal frequency division multiplexed (OFDM) signal including data encoded in a plurality of data subcarriers. The channel estimation logic is configured to determine a signal-to-noise ratio of data subcarriers in the output data, and determine the estimated channel based, at least in part, on the signal-to-noise ratio of the data subcarriers in the output data.

In one embodiment, the channel estimation logic is configured to determine the estimated channel based, at least in part, on the pilot data in the signal.

In one embodiment, the channel estimation logic includes a first channel estimation logic configured to determine a first estimated channel based on the pilot signal components. The equalizer is configured to process the non-pilot data based, at least in part, on the first estimated channel to produce a first equalized signal. The decision logic is configured to decode the first equalized signal to produce first output data. The channel estimation logic includes a second channel estimation logic configured to determine a second estimated channel for the signal based, at least in part, on the first output data. The channel estimation logic determines the estimated channel based, at least in part, on the first estimated channel and the second estimated channel.

In one embodiment, the signal is an OFDM signal including data encoded in a plurality of data subcarriers. The channel estimation logic further includes an update logic configured to determine a signal-to-noise ratio of data subcarriers in the output data and determine the estimated channel by combining the first estimated channel and the second estimated channel with respective weights based, at least in part, on the signal-to-noise ratio.

In one embodiment, the apparatus also includes an interpolation logic configured to adapt an interpolation technique based, at least in part, on the first output data, wherein the interpolation logic adapts the interpolation technique by i) modifying interpolation parameters, ii) selecting a different interpolation technique, or iii) both modifying interpolation parameters and selecting a different interpolation technique. The first channel estimation logic determines the first estimated channel using the adapted interpolation technique.

In one embodiment, the signal is an OFDM signal including data encoded in a plurality of data subcarriers. The channel estimation logic further includes an update logic configured to determine a signal-to-noise ratio of data subcarriers in the output data. The interpolation logic adapts the interpolation technique based, at least in part, on the signal-to-noise ratio.

In general, in another aspect, this specification discloses a method for estimating a channel between a wireless transmitter and a wireless receiver. The method includes receiving a signal comprising non-pilot data that is not known to a receiver of the signal; determining an estimated channel for the signal based, at least in part, on the non-pilot data; processing the signal based, at least in part, on the estimated channel to produce an equalized signal; and decoding the equalized signal to produce output data.

In one embodiment, the signal is an OFDM signal including data encoded in a plurality of data subcarriers. Determining the estimated signal includes determining a signal-to-noise ratio of data subcarriers in the output data and estimating the channel based, at least in part, on the signal-to-noise ratio of the data subcarriers in the output data.

In one embodiment, the signal includes pilot data know to the receiver of the signal; and the estimating includes estimating the channel based, at least in part, on the pilot data in the signal.

In one embodiment, the determining includes determining a first estimated channel based on the pilot data. The processing includes processing the non-pilot data based, at least in part, on the first estimated channel to produce a first equalized signal. The decoding includes decoding the first equalized signal to produce first output data. A second estimated channel is determined for the signal based, at least in part, on the first output data. The estimated channel is determined based, at least in part, on the first estimated channel and the second estimated channel.

In one embodiment, the signal is an OFDM signal comprising data encoded in a plurality of data subcarriers. The method includes determining a signal-to-noise ratio of data subcarriers in the first output data and estimating the channel by combining the first estimated channel and the second estimated channel with respective weights based, at least in part, on the signal-to-noise ratio.

In one embodiment, estimating the first channel includes adapting an interpolation technique based, at least in part, on the output data by i) modifying interpolation parameters, ii) selecting a different interpolation technique, or iii) both modifying interpolation parameters and selecting a different interpolation technique. The first estimated channel is determined using the adapted interpolation technique.

In one embodiment, the signal is an OFDM signal comprising data encoded in a plurality of data subcarriers. The method includes determining a signal-to-noise ratio of data subcarriers in the first output data and adapting the interpolation technique based, at least in part, on the signal-to-noise ratio. The method includes determining the first estimated channel using the adapted interpolation technique.

In general, in another aspect, this specification discloses a device for estimating a channel between a wireless transmitter and a wireless receiver. The device includes a receiver circuit configured to receive an OFDM signal comprising data encoded in a plurality of data subcarriers. The device includes a channel estimation logic circuit configured to determine an estimated channel based, at least in part, on non-pilot data in the signal. The device includes an equalizer circuit configured to process the signal based, at least in part, on the estimated channel to produce an equalized signal. The device includes a decision logic circuit configured to decode the equalized signal to produce output data. The channel estimation logic circuit is configured to determine a signal-to-noise ratio of data subcarriers in the output data and estimate the channel based, at least in part, on the signal-to-noise ratio of the data subcarriers in the output data.

In one embodiment, the OFDM signal includes pilot data and non-pilot data. The channel estimation logic circuit is configured to determine the estimated channel based, at least in part, on the pilot data in the signal.

In one embodiment, the channel estimation logic circuit is configured to determine a first estimated channel based on the pilot signal components. The equalizer circuit is configured to process the non-pilot signal components based, at least in part, on the first estimated channel to produce a first equalized signal. The decision logic circuit is configured to decode the first equalized signal to produce first output data. The channel estimation logic includes a second channel estimation logic configured to determine a second estimated channel for the signal based, at least in part, on the first output data. The channel estimation logic determines the estimated channel based, at least in part, on the first estimated channel and the second estimated channel.

In one embodiment, the channel estimation logic circuit is further is configured to determine respective signal-to-noise ratios of respective data subcarriers in the output data and determine the estimated channel for respective data subcarriers by combining the first estimated channel and the second estimated channel with respective weights based, at least in part, on the signal-to-noise ratio of the respective data subcarrier.

In one embodiment, the channel estimation logic circuit is further is configured to adapt an interpolation technique based, at least in part, on the output data by i) modifying interpolation parameters, ii) selecting a different interpolation technique, or iii) both modifying interpolation parameters and selecting a different interpolation technique. The channel estimation logic is configured to determine the first estimated channel using the selected interpolation technique.

In one embodiment, the channel estimation logic circuit is further is configured to adapt the interpolation technique based, at least in part, on the signal-to-noise ratio.

BRIEF DESCRIPTION OF THE DRAWINGS

The accompanying drawings, which are incorporated in and constitute a part of the specification, illustrate various systems, methods, and other embodiments of the disclosure. Illustrated element boundaries (e.g., boxes, groups of boxes, or other shapes) in the figures represent one example of the boundaries. In some examples one element may be designed as multiple elements or multiple elements may be designed as one element. In some examples, an element shown as an internal component of another element may be implemented as an external component and vice versa.

DETAILED DESCRIPTION

Described herein are examples of systems, methods, and other embodiments associated with techniques for estimating a channel between a transmitter and a receiver in a wireless network. The systems, methods, and other embodiments described herein estimate a channel between a transmitter and receiver based, at least in part, on non-pilot signal components of the signal corresponding to non-pilot data carried by the received signal. In one embodiment, after the non-pilot data, also called decision data, is decoded from a received signal, the non-pilot data is fed back to a channel estimation logic that determines an effective channel. In one embodiment, the channel estimation logic also uses pilot signals components in the received signal to determine the effective channel. The channel estimation logic combines a first effective channel estimated based on pilot sequence components in the received signal with a second effective channel estimated based on the non-pilot data to determine the effective channel.

Figure 1:
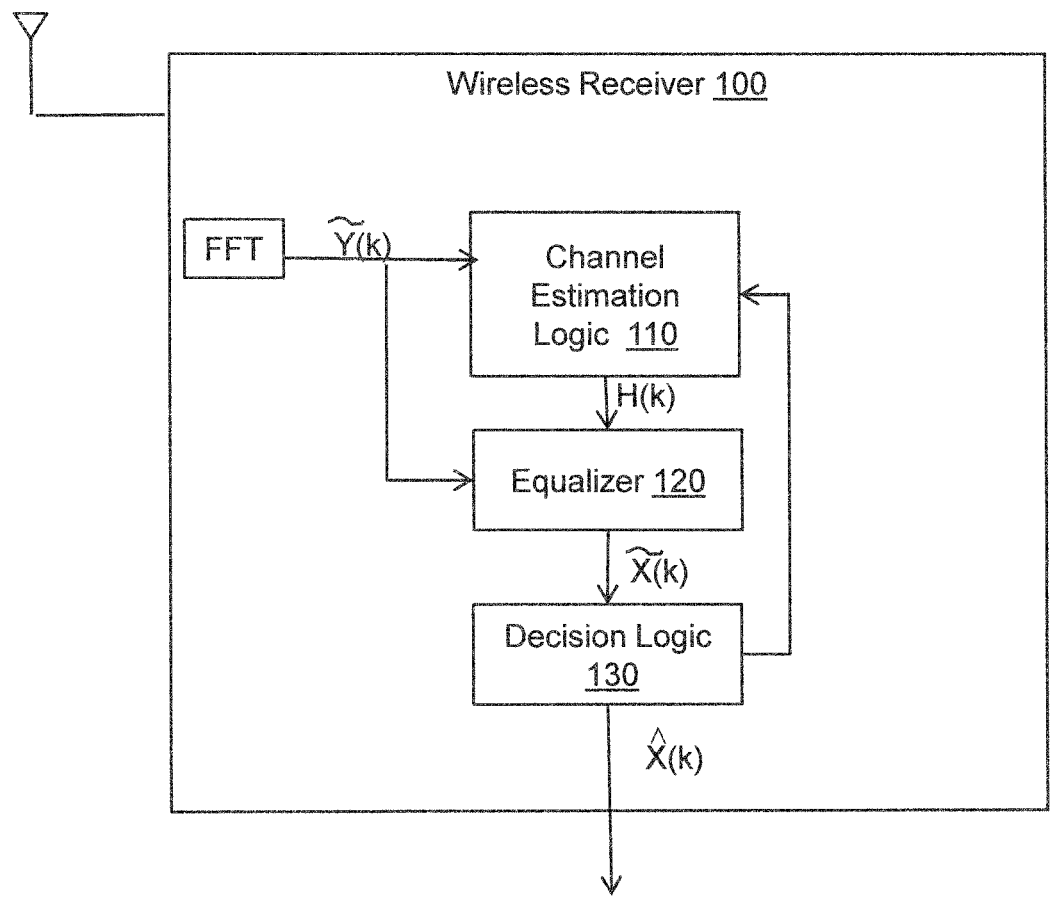
FIG. 1 illustrates one embodiment of an apparatus associated with channel estimation with decision feedback.

FIG. 1 illustrates one embodiment of an orthogonal frequency division multiplexed (OFDM) wireless receiver 100 configured to perform channel estimation in accordance with techniques described herein. The wireless 100 receiver includes a channel estimation logic 110, an equalizer 120, and a decision logic 130. The channel estimation logic 110 estimates the effective channel through which a received signal, $\tilde{Y}(k)$, traveled from a transmitter. The estimated channel H(k) is an estimate of the effective channel between the transmitter and the receiver. The estimated channel H(k) is provided to the equalizer 120, which equalizes the signal $\tilde{Y}(k)$ based on the estimated channel H(k) to remove the effects of the channel from the signal $\tilde{Y}(k)$ to produce an equalized signal $\tilde{X}(k)$. The equalized signal $\tilde{X}(k)$ is decoded by the decision logic 130 to produce output data $\hat{X}(k)$ that corresponds to a most likely value of the data encoded in the received signal $\tilde{Y}(k)$. The output data $\hat{X}(k)$ is fed back to the channel estimation logic 110. The channel estimation logic uses the output data to produce the estimated channel H(k). In this manner, the channel estimation logic 110 estimates the channel based, at least in part, on the output data which is derived from non-pilot data, as opposed to relying solely on pilot components of the received signal $\tilde{Y}(k)$.

Figure 2:
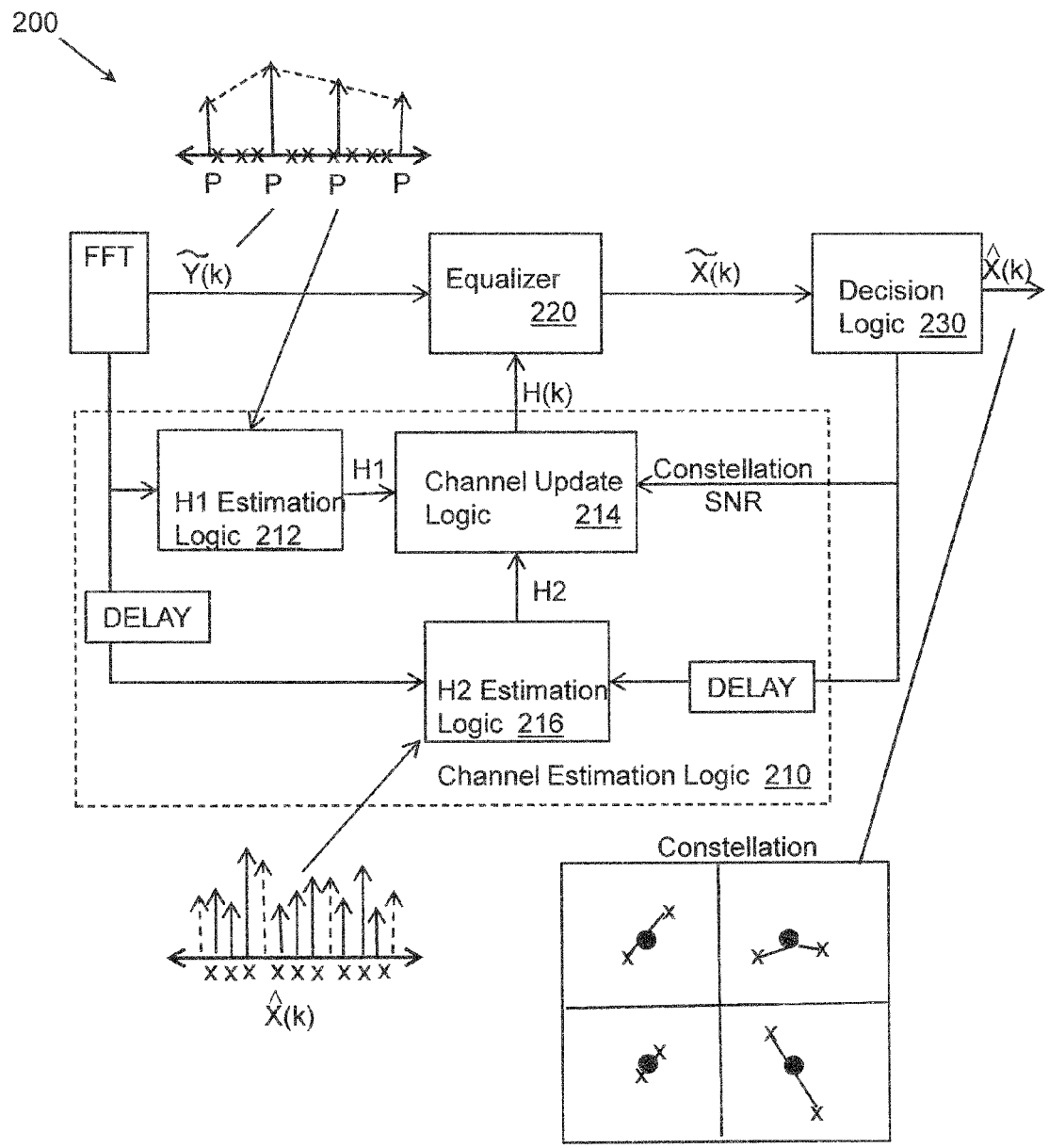
FIG. 2 illustrates one embodiment of an apparatus associated with channel estimation with decision feedback.

FIG. 2 illustrates one embodiment of a receiver 200 that processes OFDM signals using channel estimation with decision feedback. After being converted to the frequency domain by an FFT module, the received signal $\tilde{Y}(k)$ may be conceptualized as shown in FIG. 2. Equally spaced positions along the X (frequency) axis in the received signal corresponds to different data subcarrier frequencies. Pilot signals P are interleaved in the received signal at known subcarrier frequencies. Data encoded in the received signal is shown as x's within the received signal.

A channel estimation logic 210 estimates a channel H(k) for use by an equalizer 220 in producing an equalized signal $\tilde{X}(k)$. The equalized signal is decoded by a decision logic 230 to produce output data $\hat{X}(k)$. In OFDM signal processing that utilizes digital modulation (e.g., quadrature amplitude modulation (QAM)), it is convenient to express the output data as a constellation diagram like the one shown in FIG. 2. The constellation diagram maps constellation values that are used in data subcarriers. The constellation values are mapped from cell words that are sets of parallel input data bits in the transmitted signal. Until the received signal $\tilde{Y}(k)$ is decoded, it is not known in which particular constellation values the data points (e.g., cell word) belong.

The constellation diagram is a two-dimensional scatter diagram in the complex plane at a given cell sampling instant. The circles represent possible constellation values that may be selected by a given modulation scheme as points in the complex plane. Each circle corresponds to one constellation value. The x's on the constellation diagram represent the received cell words. The decision logic 230 decodes the equalized signal $\tilde{X}(k)$ by deciding to which constellation value each data cell word most likely belongs and constructing the output data $\hat{X}(k)$ with the data values at the proper (e.g., most likely) data values at subcarrier frequencies. The distance between the data points and their "assigned" circle is corresponds to a signal to noise ratio (SNR) of the output data $\hat{X}(k)$.

The channel estimation logic 210 includes an H1 estimation logic 212 that estimates a first channel H1 based on the pilot components of the received signal. This estimation may be performed by interpolating between the pilot signals as shown by the dashed line in received signal $\tilde{Y}(k)$ to create an estimated channel for the data point subcarriers. A channel update logic 214 utilizes the first channel H1 to create the estimated channel H(k) that is provided to the equalizer 220. Initially, the equalizer 220 equalizes the received signal based only on H1 and the decision logic 230 decodes the signal to produce output data $\hat{X}(k)$.

The tentative output data, which has been aligned with subcarrier frequencies by the decision logic 230 is fed back to an H2 estimation logic 216. The tentative output data $\hat{X}(k)$ is illustrated in the frequency domain as the series of equally spaced arrows on the frequency axis. The pilot signals are shown in dotted line in $\hat{X}(k)$. The H2 estimation logic uses the tentative output data in the same manner as the H1 estimation logic uses the pilot signals to estimate a second channel H2. A delay element is interposed between the decision logic 230 and the H2 estimation logic 216 as well as between the FFT module and the H2 estimation logic 216 to align the received data $\tilde{Y}(k)$ with the output data $\hat{X}(k)$ that was derived from the received data.

The second channel H2 is provided to the channel update logic 214, which determines the estimated channel H(k) based on both channels H1 and H2. The equalizer 220 uses the estimated channel H(k) to equalize the signal and the decision logic 230 decodes the equalized signal to produce output data. In this manner, the channel update logic 214 is able to leverage the additional information about the channel that can be found using the output data $\hat{X}(k)$ thereby improving the estimated channel and, accordingly, the output data.

In one embodiment, the tentative output data $\hat{X}(k)$ as well as an SNR of the tentative output data is provided to the channel update logic 214. The channel update logic 214 utilizes the SNR and the tentative output data to determine relative weighting for H1 and H2. For example, if the SNR is high, more weight may be given to H2. Likewise, if the SNR is low, more weight may be given to H1. Weighting may be done on a per carrier basis using the SNR for each carrier.

Figure 3:
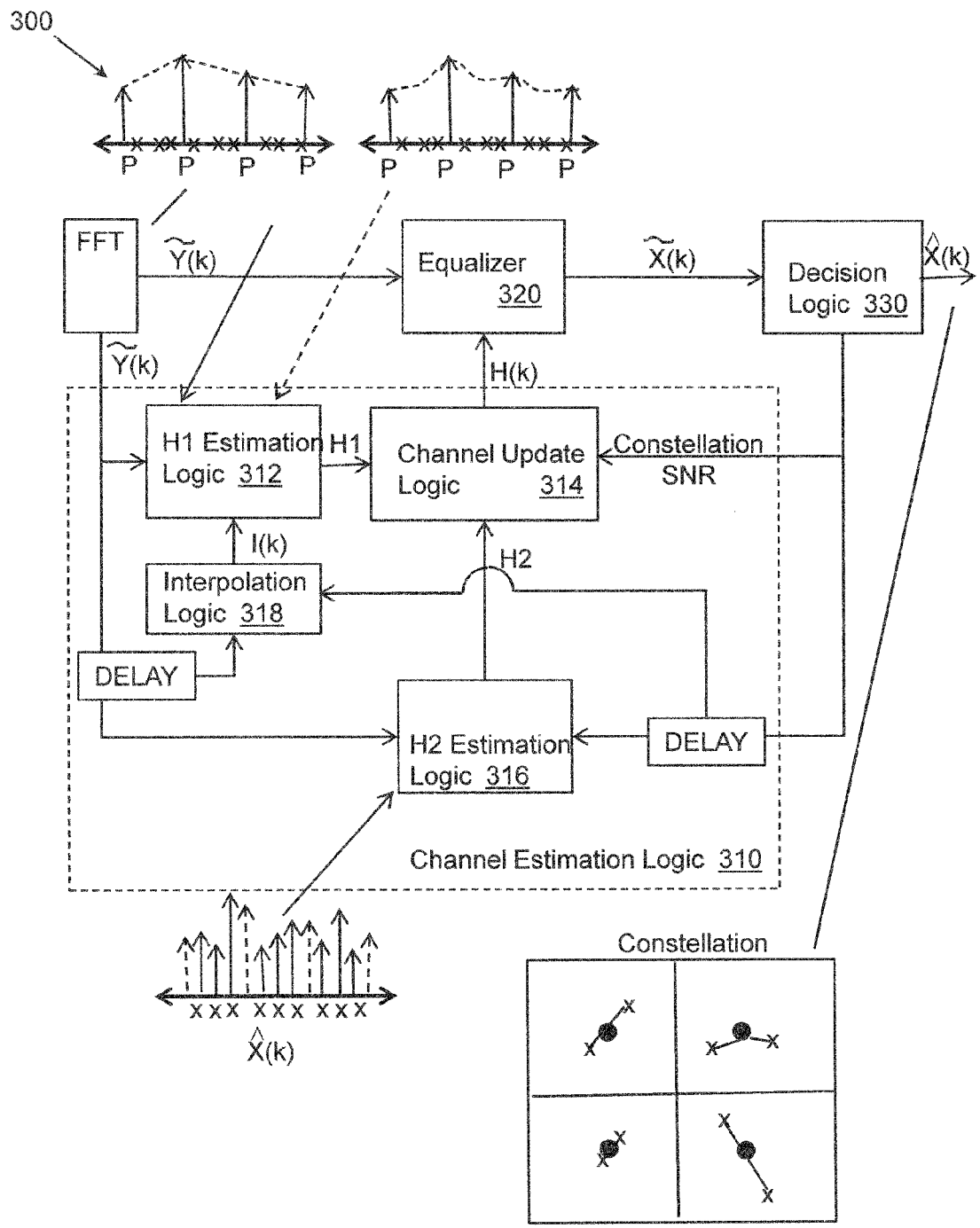
FIG. 3 illustrates one embodiment of an apparatus associated with channel estimation with decision feedback.

FIG. 3 illustrates one embodiment of a receiver 300 that processes orthogonal frequency division multiplexed (OFDM) signals using channel estimation with decision feedback and adaptive interpolation. A channel estimation logic 310 estimates a channel H(k) for use by an equalizer 320 in producing equalized signal $\tilde{X}(k)$. The equalized signal is decoded by a decision logic 330 to produce output data $\hat{X}(k)$. The decision logic 330 decodes the output data $\hat{X}(k)$ by deciding to which constellation value each data cell most likely belongs and constructing the output data $\hat{X}(k)$ with the data values at the proper (e.g., most likely) data values at subcarrier frequencies.

The channel estimation logic 310 includes an H1 estimation logic 312 that estimates a first channel H1 based on the pilot components of the received signal. This estimation may be performed by interpolating between the pilot signals as shown by the dashed line in $\tilde{Y}(k)$ to create an estimated channel that covers the data points. An interpolation logic 318 selects an interpolation method (e.g., linear, spline, cubic, low pass filter) for use in estimating the first channel H1 based on the pilot components of the signal. A default interpolation technique may be selected (e.g., linear interpolation as shown in dashed line on the received signal $\tilde{Y}(k)$ on the left). A channel update logic 314 utilizes the first channel H1 to create the estimated channel H(k) that is provided to the equalizer 320. Initially, the equalizer 320 equalizes the received signal based on H1 and the decision logic 330 decodes the signal to produce tentative output data $\hat{X}(k)$.

The tentative output data, which has been aligned with subcarrier frequencies by the decision logic 330 is fed back to an H2 estimation logic 316. The H2 estimation logic 316 uses the tentative output data in the same manner as the H1 estimation logic 312 uses the pilot signals to estimate a second channel H2. A delay element is interposed between the decision logic 330 and the H2 estimation logic 316 as well as between the FFT module and the H2 estimation logic 316 to align the received data Ŷ(k) with the output data X̂(k) that was derived from the received data.

The tentative output data X̂(k) is also fed back to the interpolation logic 318. The interpolation logic 318 uses the tentative data to select an interpolation technique and/or adapt interpolation parameters to best fit the tentative data. The H1 channel estimation logic uses the selected and/or adapted interpolation technique (e.g., the curved interpolation shown in dashed line on the received signal Ŷ(k) on the right) to re-estimate the first channel H1. The re-estimated first channel H1 and the second channel H2 are provided to the channel update logic, which determines the estimated channel H(k) based on both H1 and H2. The equalizer 320 uses the estimated channel H(k) to equalize the signal and the decision logic 330 decodes the equalized signal to produce output data. In another embodiment, parameters and coefficients used in the original interpolation technique are adapted to better fit the tentative data and the interpolation operation is performed again. In this manner, the channel update logic 314 is able to leverage the additional information about the channel that can be found using the output data X̂(k) thereby improving both the estimated channel H1 and the channel H(k) and, accordingly, the output data X̂(k).

In one embodiment, the tentative output data X̂(k) as well as the SNR of the tentative output data is provide to the channel update logic 314. The channel update logic 314 utilizes the SNR and the tentative output data X̂(k) to determine relative weighting for H1 and H2. For example, if the SNR is high, more weight may be given to H2. Likewise, if the SNR is low, more weight may be given to H1. Weighting may be done on a per carrier basis using the SNR for each carrier.

Figure 4:
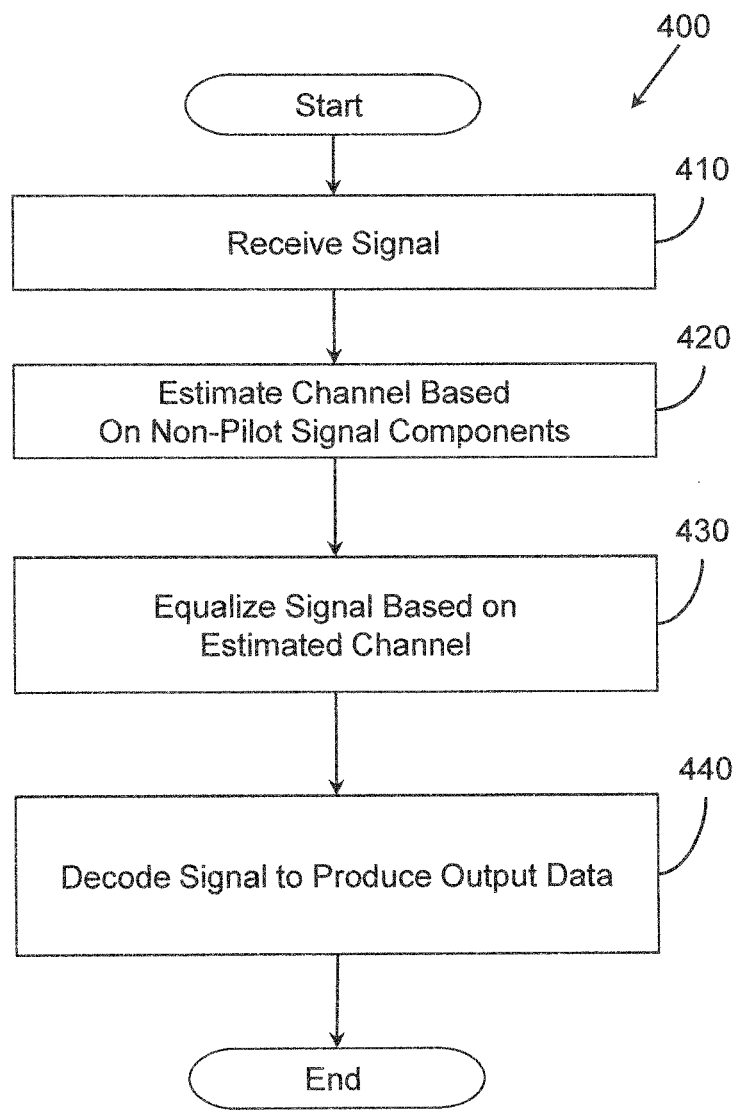
FIG. 4 illustrates one embodiment of a method associated with channel estimation with decision feedback.

FIG. 4 illustrates one embodiment of a method 400 of estimating a channel with decision feedback. The method includes, at 410, receiving a signal that includes non-pilot signal components corresponding to non-pilot data being carried by the signal. Non-pilot signal components include data that is encoded in the signal to be communicated by the signal, as opposed to a prior known pilot signals that are encoded in the signal to facilitate channel detection. At 420, the method includes estimating a channel for the signal based, at least in part, on the non-pilot signal components. At 430, the method includes processing the non-pilot signal components based, at least in part, on the channel to produce an equalized signal. At 440, the method includes decoding the equalized signal to produce output data.

In one embodiment, the signal is an OFDM signal comprising data encoded in a plurality of data subcarriers. In this embodiment, the estimating is performed by determining an SNR of data subcarriers in the output data and estimating the channel based, at least in part, on the SNR of the data subcarriers in the output data. Weighting may be done on a per carrier basis using the SNR for each carrier.

In one embodiment, the signal includes both pilot signal components and non-pilot signal components. In this embodiment, the estimating is performed by estimating the channel based, at least in part, on pilot signal components in the signal as well as the non-pilot signal components.

Figure 5:
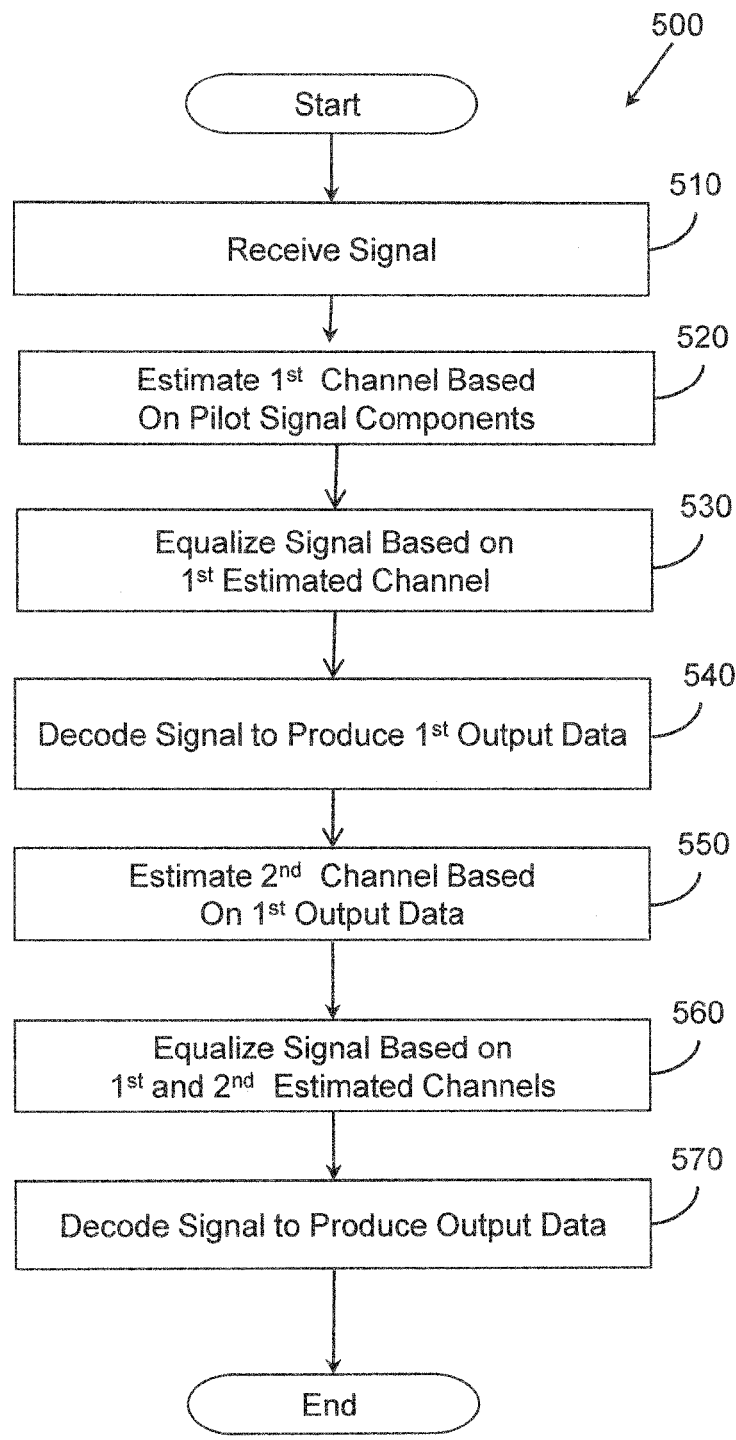
FIG. 5 illustrates one embodiment of a method associated with channel estimation with decision feedback.

FIG. 5 illustrates one embodiment of a method 500 of estimating a channel with decision feedback. At 510, the method includes receiving a signal that includes non-pilot signal components corresponding to non-pilot data being carried by the signal and pilot signal components. At 520, the method includes estimating a first channel based on the pilot signal components. At 530, the method includes equalizing the non-pilot signal components based, at least in part, on the first channel to produce a first equalized signal. At 540, the method includes decoding the first equalized signal to produce first output data. At 550, the method includes estimating a second channel for the signal based, at least in part, on the first output data. At 560, the method includes equalizing the non-pilot signal components based, at least in part, on the first channel and the second channel to produce a second equalized signal. At 570, the method includes decoding the second equalized signal to produce second output data.

In one embodiment, the signal is an OFDM signal comprising data encoded in a plurality of data subcarriers. In this embodiment, the method also includes determining an SNR of data subcarriers in the first output data and estimating the channel by combining the first channel and the second channel with respective weights based, at least in part, on the SNR.

In one embodiment, the method includes estimating the first channel by selecting an interpolation technique based, at least in part, on the first output data and estimating the first channel using the selected interpolation technique. When the signal is an OFDM signal, the method may include determining an SNR of data subcarriers in the first output data and selecting the interpolation technique based, at least in part, on the SNR.

Figure 6:
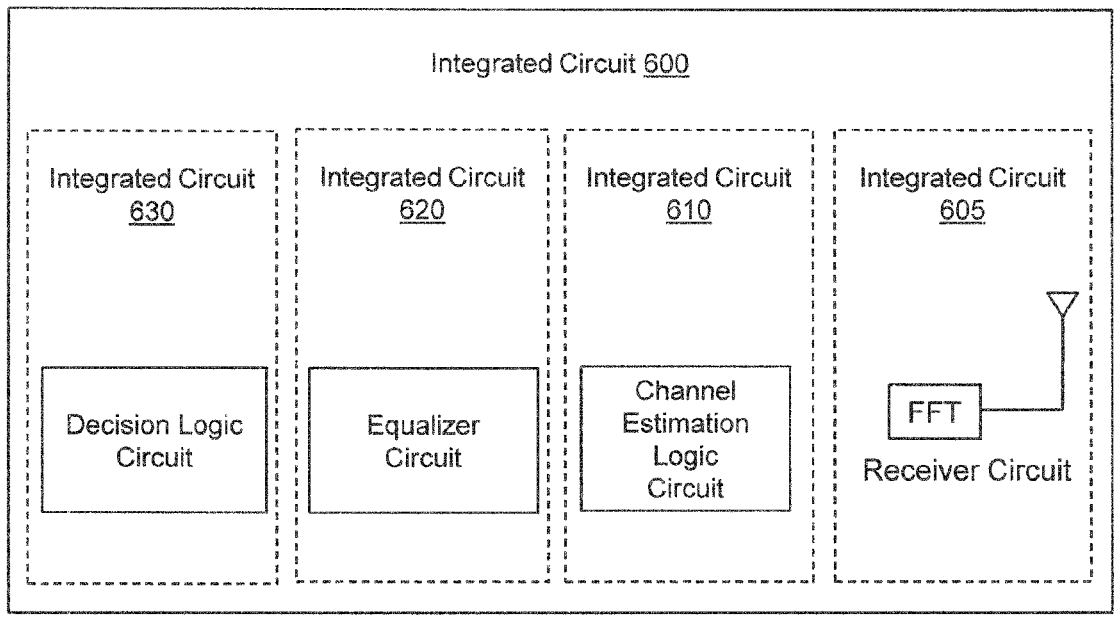
FIG. 6 illustrates one embodiment of an integrated circuit associated with channel estimation with decision feedback.

FIG. 6 illustrates one embodiment of an integrated circuit device 600 configured to perform channel estimation with decision feedback. The device 600 includes a receiver circuit 605, a channel estimation logic circuit 610, an equalizer circuit 620, and a decision logic circuit 630. The receiver circuit 605 is configured to receive an OFDM signal comprising data encoded in a plurality of data subcarriers and to perform an FFT operation on the signal to transform the signal into the frequency domain. The equalizer circuit 620 is configured to process the signal based, at least in part, on a channel to produce an equalized signal. The channel estimation logic circuit 610 is configured to estimate the channel based, at least in part, non-pilot signal components corresponding to non-pilot data being carried by the signal. The decision logic circuit 630 is configured to decode the equalized signal to produce output data. The channel estimation logic circuit 610 is further configured to determine a signal to noise ratio of data subcarriers in the output data and estimate the channel based, at least in part, on the SNR of the data subcarriers in the output data.

In one embodiment the receiver circuit 605 is configured to receive an OFDM signal that includes pilot signal components and non-pilot signal components. The channel estimation logic circuit 610 is configured to estimate the channel based, at least in part, on pilot signal components in the signal.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes but is not limited to hardware, firmware, instructions stored on a non-transitory computer-readable medium, and/or combinations of each to perform a function(s) or an action(s), and/or to cause a function or action from another logic, method, and/or system. Logic may include a microprocessor programmed to perform one or more of the disclosed functions/methods, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics. One or more of the components and functions described herein may be implemented using one or more of the logic elements.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

What is claimed is:

1. An apparatus, comprising:
    a receiver configured to receive a signal transmitted through an effective channel, wherein the signal comprises i) pilot data that is known to the receiver and ii) non-pilot data that is not known to the receiver;
    a channel estimation logic, comprising:
        a first channel estimation logic configured to determine a first estimated channel by applying an interpolation technique to the pilot data;
        a second channel estimation logic configured to determine a second estimated channel for the signal based, at least in part, on the non-pilot data; and
        an update logic configured to:
            determine a signal-to-noise ratio of data subcarriers in the signal; and
            determine the estimated channel by combining the first estimated channel and the second estimated channel with respective weights based, at least in part, on the signal-to-noise ratio;
    an equalizer configured to process the signal based, at least in part, on the estimated channel to produce an equalized signal;
    a decision logic configured to decode the equalized signal to produce output data; and
    an interpolation logic configured to adapt the interpolation technique based, at least in part, on the output data such that the interpolation technique is adapted to better fit the output data.

2. The apparatus of claim 1, wherein the signal is an orthogonal frequency division multiplexed (OFDM) signal comprising data encoded in the plurality of data subcarriers.

3. The apparatus of claim 1, wherein:
    the equalizer is configured to process the non-pilot signal components based, at least in part, on the first estimated channel to produce a first equalized signal;
    the decision logic is configured to decode the first equalized signal to produce first output data; and
    the second channel estimation logic is configured to determine the second estimated channel for the signal based, at least in part, on the first output data.

4. The apparatus of claim 3,
    wherein the interpolation logic adapts the interpolation technique by i) modifying interpolation parameters, ii) selecting a different interpolation technique, or iii) both modifying interpolation parameters and selecting a different interpolation technique.

5. The apparatus of claim 4, wherein
    the interpolation logic adapts the interpolation technique based, at least in part, on the signal-to-noise ratio.

6. The apparatus of claim 1, wherein the channel estimation logic is further configured to determine respective estimated channels for respective data subcarriers by:
    determining respective first estimated channels for respective data subcarriers;
    determining respective second estimated channels for respective data subcarriers;
    determining respective weights for respective data subcarriers based on respective signal-to-noise ratios for the respective data subcarriers; and
    for each data subcarrier, combining the first estimated channel for the data subcarrier with the second estimated channel for the data subcarrier as weighted by the weight for the data subcarrier.

7. The apparatus of claim 1, wherein the channel estimation logic is configured to increase a relative weight of the first estimated channel with respect to the second estimated channel when the signal-to-noise ratio decreases.

8. A method, comprising:
    receiving a signal comprising non-pilot data that is not known to a receiver of the signal and pilot data that is known to the receiver;
    determining a first estimated channel based on the pilot data by applying an interpolation technique to the pilot data;
    determining a second estimated channel for the signal based, at least in part, on the non-pilot data;
    determining a signal-to-noise ratio of data subcarriers in the signal;
    estimating the channel by combining the first estimated channel and the second estimated channel with respective weights based, at least in part, on the signal-to-noise ratio;
    processing the signal based, at least in part, on the estimated channel to produce an equalized signal;
    decoding the equalized signal to produce output data; and
    adapting the interpolation technique based, at least in part, on the output data such that the interpolation technique is adapted to better fit the output data.

9. The method of claim 8, wherein
the signal is an OFDM signal comprising data encoded in the plurality of data subcarriers.

10. The method of claim 8, further comprising
processing the non-pilot data based, at least in part, on the first estimated channel to produce a first equalized signal;
decoding the first equalized signal to produce first output data;
determining the second estimated channel for the signal based, at least in part, on the first output data.

11. The method of claim 8, comprising:
adapting the interpolation technique by i) modifying interpolation parameters, ii) selecting a different interpolation technique, or iii) both modifying interpolation parameters and selecting a different interpolation technique.

12. The method of claim 10, wherein:
the signal is an OFDM signal comprising data encoded in a plurality of data subcarriers;
further comprising:
determining a signal-to-noise ratio of data subcarriers in the first output data; and
adapting the interpolation technique based, at least in part, on the signal-to-noise ratio.

13. The method of claim 8, further comprising determining respective estimated channels for respective data subcarriers by:
determining respective first estimated channels for respective data subcarriers;
determining respective second estimated channels for respective data subcarriers;
determining respective weights for respective data subcarriers based on respective signal-to-noise ratios for the respective data subcarriers; and
for each data subcarrier, combining the first estimated channel for the data subcarrier with the second estimated channel for the data subcarrier as weighted by the weight for the data subcarrier.

14. A device comprising:
a receiver circuit configured to receive an OFDM signal comprising data encoded in a plurality of data subcarriers;
a channel estimation logic circuit configured to determine an estimated channel based, at least in part, on a combination of:
a first estimated channel based, at least in part, an interpolation of on pilot data in the signal that is interpolated using an interpolation technique;
a second estimated channel based, at least in part, on non-pilot data in the signal;
an equalizer circuit configured to process the signal based, at least in part, on the estimated channel to produce an equalized signal; and
a decision logic circuit configured to decode the equalized signal to produce output data; and
wherein the channel estimation logic circuit is further configured to:
adapt the interpolation technique based, at least in part, on the output data such that the interpolation technique is adapted to better fit the output data;
determine a signal-to-noise ratio of data subcarriers in the output data; and
estimate the channel by combining the first estimated channel and the second estimated channel with respective weights based, at least in part, on the signal-to-noise ratio of the data subcarriers in the output data.

15. The device of claim 14, wherein:
the equalizer circuit is configured to process the non-pilot data based, at least in part, on the first estimated channel to produce a first equalized signal;
the decision logic circuit is configured to decode the first equalized signal to produce first output data;
the channel estimation logic is configured to determine the second estimated channel for the signal based, at least in part, on the first output data.

16. The device of claim 14, wherein:
the channel estimation logic circuit is further is configured to
adapt the interpolation by i) modifying interpolation parameters, ii) selecting a different interpolation technique, or iii) both modifying interpolation parameters and selecting a different interpolation technique.

17. The device of claim 16, wherein the channel estimation logic circuit is further is configured to adapt the interpolation technique based, at least in part, on the signal-to-noise ratio.

18. The device of claim 14, wherein the channel estimation logic circuit is further configured to determine respective estimated channels for respective data subcarriers by:
determining respective first estimated channels for respective data subcarriers;
determining respective second estimated channels for respective data subcarriers;
determining respective weights for respective data subcarriers based on respective signal-to-noise ratios for the respective data subcarriers; and
for each data subcarrier, combining the first estimated channel for the data subcarrier with the second estimated channel for the data subcarrier as weighted by the weight for the data subcarrier.

19. The device of claim 14, wherein the channel estimation logic is configured to increase a relative weight of the first estimated channel with respect to the second estimated channel when the signal-to-noise ratio decreases.

\* \* \* \* \*